United States Patent
Phipps

[15] 3,704,083
[45] Nov. 28, 1972

[54] EXTRUSION MACHINE
[72] Inventor: Arthus L. Phipps, 6204 Raymond Court, Erie, Pa. 16505
[22] Filed: June 18, 1970
[21] Appl. No.: 47,277

[52] U.S. Cl. ........................325/71, 425/4, 425/378, 425/DIG. 60
[51] Int. Cl. ...............................B29d 7/20
[58] Field of Search......18/12 TB, 12 TT, 14 A, 14 S, 18/8 F; 425/4, 71, 378, 405, 445, DIG. 60

[56] References Cited

UNITED STATES PATENTS 1,619,768   3/1927   Schubert..................18/8 F X
3,456,044   7/1969   Pahlke....................18/14 S X
2,889,581   6/1959   Vanderhoof.........18/12 TT X
3,308,506   3/1967   Pflueger..................18/12 TB Primary Examiner—H. A. Kilby, Jr.
Attorney—Charles L. Lovercheck

[57] ABSTRACT

A method or process for the extraction of a material, especially delicate or fragile materials such as plastic foams or forms, out of a vacuum chamber and removing the material from the chamber into atmospheric pressure without exerting destructive forces on the material other than the gradual application of the atmospheric pressure itself through the use of a liquid medium.

3 Claims, 7 Drawing Figures

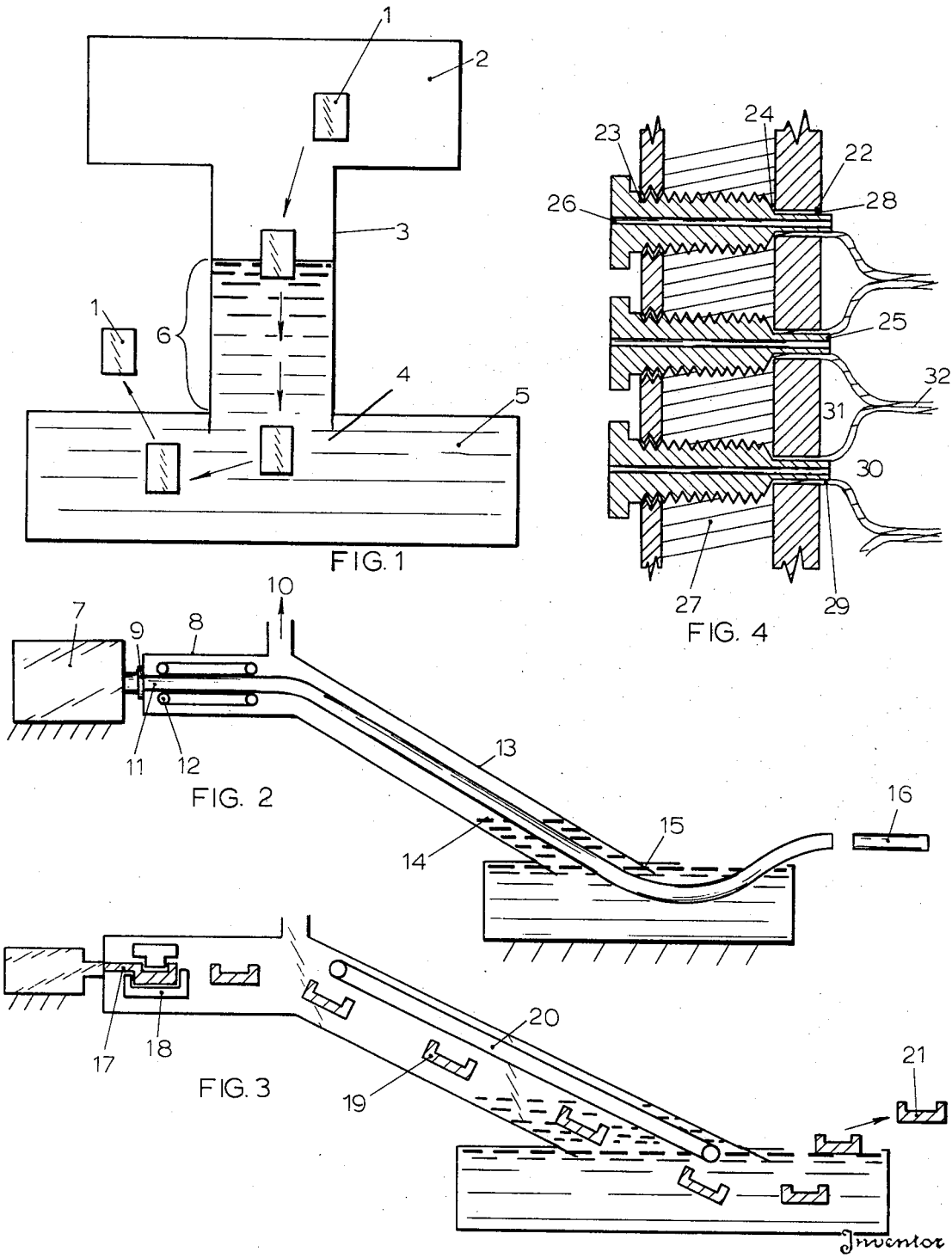

Inventor
ARTHUR L. PHIPPS

EXTRUSION MACHINE

STATEMENT OF PRIOR ART

The use of a barometric leg has a long history of utility as a means of egress of condensate vapors from reduced pressure to atmospheric pressure, as in multiple effect evaporators. A barometric leg has never been conceived as a means of egress from reduced pressure of solid materials, more particularly plastic foams and shapes especially extruded plastics materials; this is a new and novel process for such applications. The utility of such a process can be shown in the commercially viable applications of producing materials not now available including, but not limited to, low density extruded polystyrene foam boards and planks and many extruded plastic shapes, especially fragile, hollow, extruded plastic shapes.

OBJECTS OF THE INVENTION

It is an object of the invention to provide an improved attachment for a plastic extrusion machine.

Another object of the invention is to provide a plastic extrusion machine in combination with a barometric leg.

Another object of the invention is to provide a plastic extrusion machine attachment that is simple in construction, economical to manufacture and simple and efficient to use.

DESCRIPTION OF THE DRAWINGS

FIG. 1 is a schematic view illustrating the principle of the invention;

FIG. 2 is a schematic view of one embodiment of the extruder attachment;

FIG. 3 is a schematic view of another embodiment of the extruder attachment;

FIG. 4 is a schematic view of a part used with the embodiments of FIGS. 2 of 3;

DETAILED DESCRIPTION OF THE DRAWINGS

Figure 5:
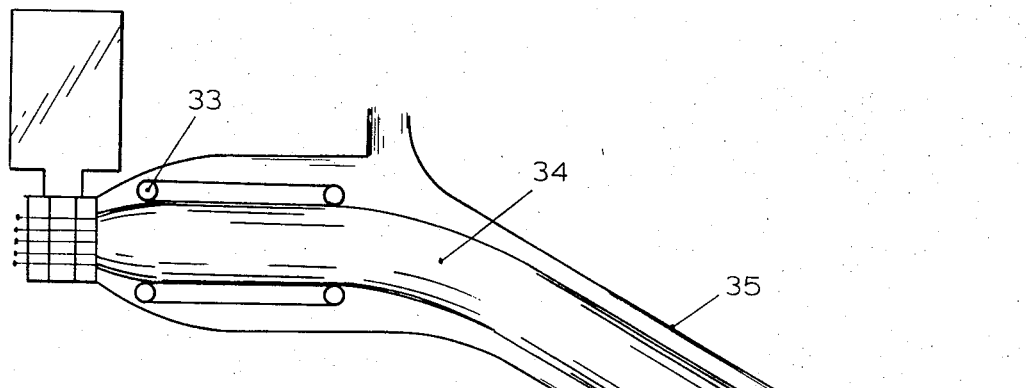
FIG. 5 is another view of a part of another embodiment of the extruder attachment.

Referring to FIG. 1, the invention will teach that the materials 1 may either continuously or intermittently be passed out of the vacuum chamber 2 by passage down through a pipe 3 or pipe-like closed system such as a trough with a sealed lid, whose open lower end 4 is immersed in a pond or pool of liquid 5, which may be water, which liquid will be drawn up into the pipe to a height 6 determined by the difference between the atmospheric pressure and the absolute pressure in the vacuum chamber and also by the density of the liquid. The device may be called a "barometric leg" or a "liquid leg." Pipe 3, leg 13 and the pipe in FIG. 3 may be considered barometric legs. Water is the liquid which will ordinarily be used.

An application of the invention is as follows: Referring to FIG. 2, a plastics extruder 7 especially intended for extrusion of polystyrene foam, such extruders are commercially available, is installed adjacent to the vacuum chamber 8 in such a way that the extrudate 11 leaving the extruder enters the vacuum chamber through appropriate vacuum seals 9. Vacuum will be applied and maintained in the chamber by way of connection 10 with a suitable vacuum device such as a pump or a steam ejector. The extrudate is shaped and conveyed away from the extruder by means of two belts 12 shown or other appropriate dies, devices, or machinery 20 totally or partially contained within the vacuum chamber which are familiar to those skilled in the art. The extrudate in the shape of a plank or board or other shape is guided and pushed down a slope of, for example, 15° from horizontal, within a pipe-like barometric leg 13 filled with water to a level 14 as determined by the difference in pressures inside and outside the vacuum chamber.

The extrudate will enter the water, continuing to pass through the water until finally the extrudate will emerge from the submerged open end 15 of the pipe-like structure whereupon the extrudate will gradually be curved up and out of the pond of water or will be otherwise removed from the pond.

The extrudate may be cut into pieces 16 as long or as short as may be desired.

Foam planks made by the process will exhibit one or more of the following advantages: Lower cost than other polystyrene foam planks on the market, better or more consistent quality than many polystyrene foam planks on the market, lower bulk density than other polystyrene foam planks on the market.

Referring to FIG. 3, a polystyrene foam extruder will be connected to the vacuum chamber as in the first example. The hot, expanded foam 17 may remain soft and pliable for several seconds. During this time, while still soft, the foam may be compressed into shapes, either continuously connected shapes or intermittent shapes, and held in the new configuration long enough to maintain itself in the configuration before being released by the compressing device. The compressing device 18 (metal, plastic, rubber, etc.) may be in the form of embossing patterns, molds for boxes, molds for other articles, and may be affixed to rolls, belts, etc. The shapes 19 would continue via appropriate conveyors 20 to pass through the water, pushed and guided by the conveyors and the barometric leg into the bond and therefrom be recovered 21 for further processing.

The extruder is, as in the first two examples, connected with the vacuum chamber. The extruder in this instance is equipped to extrude any thermoplastic material such as polyethylene, polystyrene, etc. The extruder die, opening into the vacuum chamber, is illustrated in principle in FIG. 4. The die will be designed with a series of holes 22 in the die face. From the rear of the die, accessible at atmospheric pressure to the operator, will project a series of threaded stems 23, one stem for each hole in the die face. Each stem will be threaded though the rear die wall, will pass through the die, and will mate with its appropriate hole on the die face. The mating of stem and hole will most likely be accomplished via a conical taper 24 on one or the other or both.

A cylindrical tip 25 on the stem which is significantly smaller in diameter than the hole will project through the hole until the tip is flush with or projecting from the die face. A tiny hole 26 will be drilled completely through the axis of the stem. As the extruder operates, the melted thermoplastic 27 will be forced out of the die through the annular space 28 between stem and hole, and the plastic will take the shape of a hollow tube 29 similar to a pipe or, in smaller sizes like a soda straw. The operator will turn the stem in one direction to open the restriction between mating surfaces of stem and hole, allowing more melted plastic to escape and thus increasing the wall thickness of the hollow tube. Turning the stem the opposite way will decrease the wall thickness of the tube. The operator will adjust each stem as required until each hole is extruding a tube of the desired wall thickness.

As the extruder operates, a bundle of tubes will be extruded into the vacuum chamber. Atmospheric pressure 30 will exist within each tube since air is free to enter through the small hole in the axis of the stem. Reduced pressure (vacuum) 31 exists outside of each tube. The result is that each tube, being soft and pliable, will swell until it meets its neighboring tubes 32, and each tube will deform until its walls form a continuum with the walls of neighboring tubes. It is likely that a close fitting hexagonal shaped cross section will result, though other more-or-less regular polygonal shapes may be obtained. Each tube wall, being hot and plastic, will weld itself to the neighboring tube walls. FIG. 5 shows the extruder and die in location extruding a bundle of tubes 34 into the vacuum chamber.

The outermost tubes in the bundle of tubes will be restrained via appropriate machinery 33 to keep them from bursting and also to shape the bundle into the desired shape such as a board, plank, cylinder, or other. The machinery may be moving conveyor, a fixed piece of metal, or other device. Water spray or other cooling devices may be employed within the vacuum chamber to congeal the molten plastic into a stable shape before release from the shaping machinery 33.

The shaped bundle of molten tubes, now congealed, has become a board, plank, or other self sustaining shape which contains many holes running parallel to each other lengthwise through the shape. The shape will be light weight and may have many industrial uses. Lengthwise compressive strength will be very high when compared with other materials on a strength to weight ratio. The shape will progress down the barometric leg 35, and gradually the pressure inside and outside of the tubes will equalize as the shape reaches the lower end of the leg whereupon it enters the pond and is reclaimed for further processing.

Figure 6:
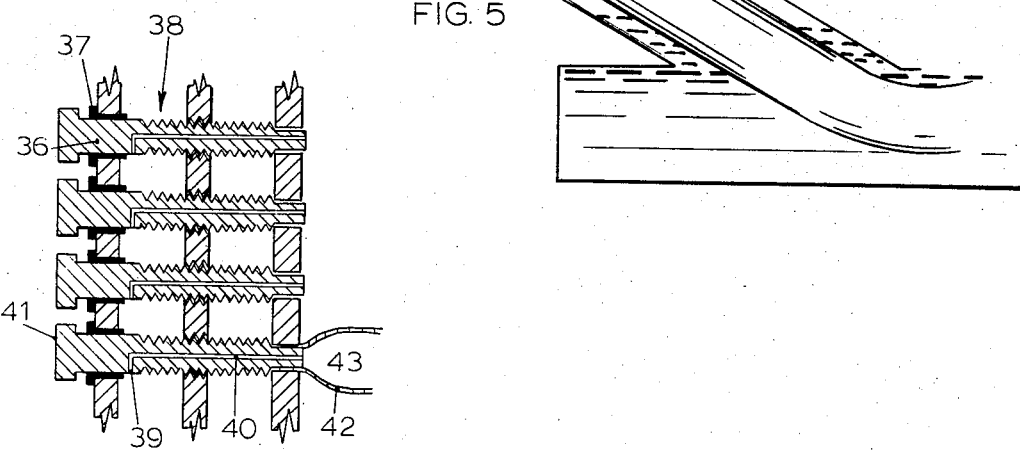
FIG. 6 is a view similar to FIG. 1 of another drainage principle for use in the embodiment shown in FIG. 7.

If the difference between vacuum and atmospheric pressures were not enough to cause a complete and adequate union of the tube walls, the modification illustrated here could apply. The air inlets to the stems would be modified so that compressed gas could be introduced through them. One way of accomplishing this is shown in FIG. 6. The heretofore described threaded stem is extended with a smooth shank 36, the shank passing through a simple packed bushing 37 located in another plate. Between the latter plate and the rear wall of the die, gas pressure at 38 would be admitted, and the gas thus trapped would find its way into the stem via a hole 39 drilled radially into the stem making contact with that hole 40 drilled axially through the stem. The axial hole would not extend to the outermost or atmospheric end 41, or if so would there be stoppered with an appropriate plug. Compressed gas being admitted to the space between die and the aforementioned plate could exit only through the radial hole into the stem, thus through the axial hole and thence into the tubular extrudate 42. The pressure within the extrudate would tend to relieve itself at once by passage down through the tube and leave via the cut end within the pond or the cut end beyond the pond, whichever were being practiced.

Figure 7:
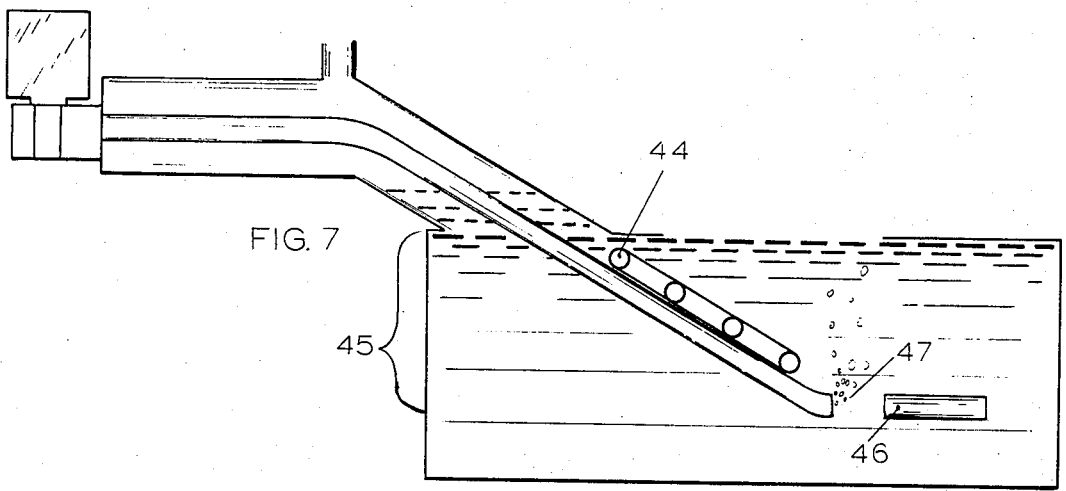
FIG. 7 is a view of another embodiment of the extruder attachment according to the invention.

Thus, referring to FIG. 7, in order to contain the desired higher pressure within the extrudate, the extruded shape must be guided 44 to some lower depth in the pond, the depth 45 being proportional to the extra pressure required. For example, if 30 pounds per square inch gauge were required, the extra depth below the surface of the pond would be about 65 feet since a head pressure of 65 feet is about 30 PSIG. The extrudate would need to be cut at 46 at the requisite depth in order to maintain the water head pressure against the internal gas pressure. Excess gas over that required to maintain the internal pressure would simply bubble out at 47 of the cut end and escape to the pond surface.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A combination comprising:
   an extruder for extruding a plastic material that is adapted to expand into the form of a relatively rigid foam material when released from said extruder,
   a vacuum chamber,
   a barometric leg,
   a pool of liquid,
   and means to guide the said foam material from said vacuum chamber and from said barometric leg into said pool of liquid,
   said extruder being connected to said vacuum chamber to continuously direct extrudite into said vacuum chamber,
   said barometric leg having a first end and a second end,
   said first end of said barometric leg being connected to said vacuum chamber,
   said second end of said barometric leg extending into said liquid in said pool,
   said liquid in said pool overlying said second end of said barometric leg and forming a seal to prevent outside atmosphere from entering said barometric leg,
   means to evacuate said vacuum chamber and said barometric leg whereby said liquid from said pool is drawn into said leg in proportion to the pressure in said chamber,
   said means to guide the foam material being adapted to engage said foam material in said liquid to carry said expanded foam material from said extruder and push the material down into said pool of liquid and onto the outside of said barometric leg.

2. The combination recited in claim 1 wherein said barometric leg extends from said vacuum chamber at an acute angle to the horizontal, and said means to guide said foam material comprises a belt conveyor.

3. The combination recited in claim 2 wherein said belt conveyor is disposed in said barometric leg.

* * * * *